Aug. 1, 1961  E. G. CLARK  2,994,788
TRANSISTORIZED CORE FLIP-FLOP
Original Filed Dec. 20, 1956
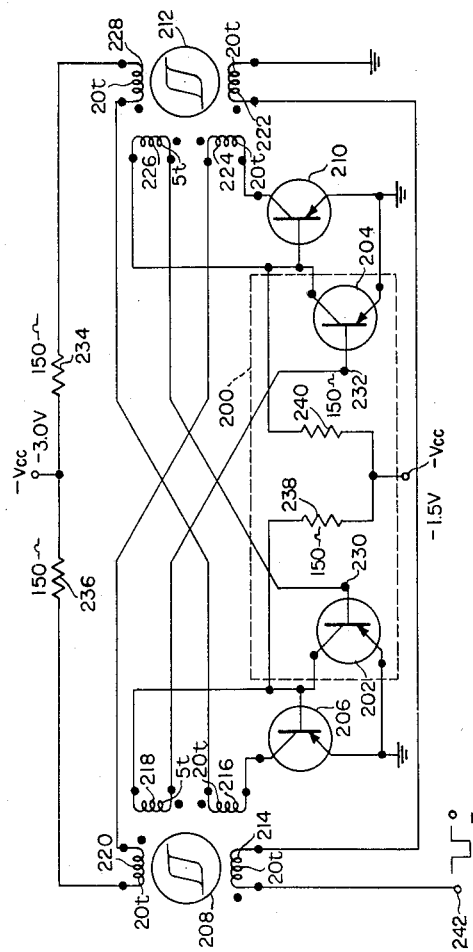
INVENTOR.
EDWARD GARY CLARK
BY
*Frank H. Cullen*
ATTORNEY United States Patent Office 2,994,788
Patented Aug. 1, 1961

2,994,788
TRANSISTORIZED CORE FLIP-FLOP
Edward Gary Clark, Paoli, Pa., assignor to Burroughs Corporation, Detroit, Mich., a corporation of Michigan
Original application Dec. 20, 1956, Ser. No. 629,570, now Patent No. 2,945,965, dated July 19, 1960. Divided and this application May 18, 1960, Ser. No. 29,892
5 Claims. (Cl. 307—88.5)

This invention relates to bistable devices, and more particularly, to complementing flip-flops.

This is a division of application Serial Number 629,570, filed December 20, 1956, for Complementing Flip-Flops, now Patent Number 2,945,965, issued July 19, 1960, and assigned to the same assignee. Another divisional application, filed the same day as this application, is Serial Number 29,893.

A flip-flop is a device having two stable states and two input terminals (or types of input signals) each of which corresponds with one of the two states. The device remains in either of its two states until caused to change to its other state by the application of the corresponding signal. A flip-flop may be changed to a complementing flip-flop by the addition of steering gates. Means is provided for coupling the steering gates to the flip-flop and to a single input terminal. By the application of pulses to the input terminal, signals are generated in the steering gates which cause the flip-flop to change state for each pulse applied.

In a complementing flip-flop having two steering gates, one of which is enabled and the other of which is disabled, the action in response to each complementing input signal, or each complementing input pulse, can be divided into two events. The first event results from applying a complementing pulse to the enabled steering gate. The enabled steering gate then applies a pulse to the proper input terminal of the flip-flop, which pulse causes the flip-flop to change to its other state. The second event is the reversal of the steering gates in preparation for the next pulse of the complementing input signal. When the steering gates reverse, the gate that was enabled at the time the first complementing pulse was initially applied becomes disabled, and the gate that was disabled becomes enabled. Each complementing input pulse has a given width, the period of time the pulse is present or applied. A phenomenon known in the art as time race occurs if the steering gates reverse while the complementing pulse, which is responsible for the reversal, is still present. When time race occurs, the complementing input pulse will cause the flip-flop to return to its initial state; and the flip-flop will continue to change state, or oscillate, as long as the complementing input pulse is present. The final state of the complementing flip-flop will then be a function of the pulse width of each complementing input pulse.

Time race has heretofore been avoided by delaying the reversal of the steering gates due to the change of state of the flip-flop for a fixed period of time by various types of delay circuits, such as integrating circuits, delay lines, etc. A complementing flip-flop having some means for delaying the reversal of the steering gates for a fixed period will hereafter be referred to as having unconditional steering. Time race in a complementing flip-flop having unconditional steering is prevented by restricting the width of each complementing pulse of the input signal so that it is less than the period of the delay. When a plurality of complementing flip-flops are cascaded to form a counter, it is necessary to provide pulse standardizers between the stages or to provide the equivalent internal action limiting the effective duration (or more specifically, the amplitude time product) of the complementing pulse inputs. As a result, the maximum pulse repetition frequency for a complementing flip-flop having unconditional steering means is substantially less than the maximum pulse repetition frequency of the corresponding noncomplementing flip-flop because of the design tolerances required for the delay circuits and the input pulse standardizer circuits.

The complementing flip-flop disclosed and claimed herein is provided with conditional steering means. When a complementing input pulse is applied to this circuit, the enabled steering gate applies a pulse to the input terminal of the flip-flop, which pulse will cause the flip-flop to change its state. Means are provided to prevent reversal of the steering gates until each complementing pulse of the input signal terminates, or is no longer present. Thus the reversal of the steering gates is conditioned upon the removal of each complementing input pulse.

Conditional steering represents the ideal means for preventing time race in a complementing flip-flop since the length of the period of the delay between the change in state of the flip-flop and the reversal of the steering gates is determined by the width of each complementing input pulse. As a consequence, a complementing flip-flop with conditional steering means, as taught herein, will operate with complementing input pulses, the width of which may be of indefinite duration, e.g., a change in D.C. level. Since there are no fixed time delays incorporated in a complementing flip-flop having conditional steering, the maximum pulse reptition frequency of a complementing flip-flop with conditional steering is substantially the upper frequency limit of the corresponding noncomplementing flip-flop.

It is, therefore, an object of this invention to improve complementing flip-flops.

A further object of this invention is to provide complementing flip-flops having conditional steering means.

It is a still further object of this invention to provide complementing flip-flops in which the reversal of the steering means is conditioned upon the removal of each complementing input pulse.

It is another object of this invention to provide a complementing flip-flop in which the steering and inhibiting functions are accomplished through the use of magnetic cores.

It is still another object of this invention to provide complementing flip-flops in which the width of each complementing input pulse may be substantially of any duration.

It is another object of this invention to provide complementing flip-flops in which the pulse width of each complementing input pulse, in excess of that necessary to trigger the complementing flip-flop is not a factor in the proper operation of the complementing flip-flops.

Other objects and many of the attendant advantages of this invention will be readily appreciated as the same become better understood by reference to the following detailed description when considered in connection with the accompanying drawing, wherein the single figure is a schematic diagram of the complementing flip-flop of this invention employing magnetic cores.

The device illustrated in the single figure of the drawing embodies the use of conditional steering to a complementing flip-flop including magnetic cores. It has additional advantages in that it may serve as a transducer between transistor and magnetic circuitry. The device has several unique characteristics; one of these is the relatively large load that it can drive, and another is that the manner of use of the magnetic cores results in higher apparent squareness ratios, or higher speeds, than predictable from the core characteristics.

It is possible to design circuits using PNP junction transistors of the alloy or surface barrier types; i.e., in the common emitter configuration, so that the transistors of such circuits will saturate, or bottom, if the potential of their bases with respect to their emitters, which are generally at ground potential, are more negative than −0.3 v. and so that the transistors will be substantially biased off if the potentials of their bases with respect to their emitters are approximately −0.1 v., or more positive. These voltages obviously may vary depending upon the characteristics of the transistors used, as is well known in the art. In such circuits the potential of the collector of a bottomed transistor will be approximately at ground potential, which potential, when applied to the base of a transistor in a similar configuration, is sufficient to cut off the transistor. The device described and illustrated is an embodiment of the invention using transistor circuits having substantially such operating characteristics.

The master flip-flop 200 has two junction transistors 202, 204 cross-coupled to form a saturated flip-flop. The steering and inhibiting functions are produced by one gate which includes transistor 206, magnetic cores 208, 212, and the other gate which includes transistor 210 and the same magnetic cores 208, 212. It is understood that the magnetic cores may be considered the flip-flop also since they operate in this manner.

On core 208 there are placed four windings, trigger winding 214, reset winding 216, sensing winding 218, and set winding 220. On core 212 there are placed trigger winding 222, reset winding 224, sensing winding 226, and set winding 28. Each of the windings is indicated as having one terminal dotted and the other undotted. In the discussion that follows it will be assumed that conventional current flowing out of the dotted terminal of the winding will tend to change the state of the core to a magnetic state denoted as 1, and that conventional current flowing into the dotted terminal of a winding will tend to change the state of the core to a magnetic state denoted as 0.

The base of transistor 202, input terminal 230 of master flip-flop 200, is connected to the dotted terminal of sensing winding 226, and the base of transistor 204, input terminal 232 of master flip-flop 200, is connected to the dotted terminal of sensing winding 218. The undotted terminal of sensing winding 226 is connected to the collector of transistor 204, and the undotted terminal of sensing winding 218 is connected to the collector of transistor 202. The dotted terminal of set winding 228 is connected to the dotted terminal of reset winding 216. The undotted terminal of reset winding 216 is directly connected to the collector of transistor 206. The undotted terminal of set winding 228 is connected through load resistor 234 to a suitable source of collector potential, $V_{cc}$. The dotted terminal of reset winding 224 is directly connected to the dotted terminal of set winding 220. The undotted terminal of reset winding 224 is connected to the collector of transistor 210, and the undotted terminal of winding 220 is connected through load resistor 236 to a suitable source of collector potential. Trigger windings 214, 222 are connected in series. The collector of transistor 202 is connected to the base of transistor 206, and the collector of transistor 204 is likewise connected to the base of transistor 210. The collector of transistor 202 is connected through load resistor 238 to a suitable source of collector potential, $V_{cc}$ of the proper polarity. The collector of transistor 204 is likewise connected through load resistor 240 to a suitable source of collector potential, $V_{cc}$ of the proper potential.

For purposes of explaining the operation of the device illustrated in the drawing, it is assumed that the initial condition of master flip-flop 200 is such that transistor 202 is cut off and transistor 204 is bottomed. Then, transistor 206, whose base is directly connected to the collector of transistor 202, will be bottomed and transistor 210, whose base is connected to the collector of transistor 204, will be cut off. The collector current of transistor 206 will flow in reset winding 216 and set winding 228 of cores 208 and 212, respectively. The magnetomotive force due to the collector current of transistor 206 flowing in these coils puts core 208 in the 1 state and core 212 in the 0 state. The magnetomotive force contributed by the base current of transistor 204 flowing through sensing winding 218 is negligible in comparison.

If a first complementing pulse of current is applied to input terminal 242 and flows through trigger windings 214, 222 in such a direction as to drive cores 208, 212 to the 1 state, core 208 will not switch, or change its magnetic state, since it is already in the 1 state. However, core 212, which is in the 0 state, is switched by the trigger pulse to the 1 state. The switching of core 212 from the 0 to the 1 state induces a voltage in sensing winding 226, which causes its dotted terminal to be at a relatively negative potential. Since input terminal 230 is connected to the dotted terminal of sensing winding 226, the negative potential induced in sensing winding 226 bottoms transistor 202.

When transistor 202 bottoms, the potential of its collector increases approximately to ground level which causes transistor 206 to cut off. This increase is connected through winding 218 to the input terminal 232, cutting off transistor 204 and changing the state of the master flip-flop 200. The potential of the collector of transistor 204 decreases, becomes more negative, which maintains transistor 202 bottomed. When transistor 204 cuts off, the negative potential of its collector bottoms transistor 210. The collector current of transistor 210 then flows through reset winding 224 and set winding 220.

The magnetomotive force of the complementing pulse is of sufficient magnitude to overcome the opposing magnetomotive force produced by the collector current of transistor 210, holding both core 208 and core 212 in the 1 state for the duration of the input pulse. Upon the conclusion of the input pulse, cores 208, 212 are released to control the master flip-flop 200 acting through transistor 210. Since transistor 210 is bottomed, its collector current flows through reset winding 224 and set windings 220, changing the state of core 208 to the 0 or enabled state. Core 212 remains in the 1, or disabled, state. The spurious pulses produced by core 208 changing from the 1 to the 0 state are in such directions as to maintain the new state of master flip-flop 200.

The application of the next, or second, complementing input current pulse will change core 208 from the 0 to the 1 state inducing a negative potential in sensing winding 218, which is applied to input terminal 232, the base of transistor 204, causing transistor 204 to bottom, which causes transistor 202 to cut off, changing the state of master flip-flop 200. When transistor 204 bottoms, its collector approaches ground potential cutting off transistor 210. While the second complementing pulse is present, it maintains cores 208, 212 in the 1 state. When the second complementing pulse terminates, the collector current of transistor 206 flows through windings 216, 228, switching core 212 to the 0, or enabled, state and maintaining core 208 in the 1, or disabled, state.

Master flip-flop 200 has a definite triggering threshold; thus the complementing flip-flop will have sufficient noise immunity to permit reliable operation at relatively low signal-to-noise ratios. When the master flip-flop is at rest, the state of cores 208, 212 is controlled by master flip-flop 200 through transistors 206, 210. Transistors 206, 210 provide isolation between master flip-flop 200 and cores 208, 212, which results in improved performance of the device. The D.C. magnetomotive force applied to the cores controls their operation, giving in effect biased cores whose natural remanence points are relatively unimportant. As a result, it is possible to accurately establish a suitable pseudo-remanence, or D.C. operating, point by the choice of the number of turns wound on the cores and the steady state transistor-collector currents.

Since transistors 206, 210 are either cut off or bottomed, their collectors currents are determined only by the collector supply potential $V_{cc}$ and the values of resistors 234, 136. The pseudo-remanence effect may be exploited to provide very large signal-to-noise ratios, or to make possible operation with nonsquare magnetic cores such as ferrites. The degree of nonsquareness permitted of the cores is determined by the available magnetomotive force and the minimum signal-to-noise ratio required.

The factors which make core-squareness noncritical make it possible to operate the complementing flip-flop at complementing pulse repetition frequencies considerably in excess of those predicted on the basis of complete core switching. Once the change of flux in a core is sufficient to trigger master flip-flop 200, completion of core switching is not essential, provided that by the time the next complementing pulse is applied, the core is sufficiently close to its opposite remanence (or pseudo-remnence) to initiate the next cycle. Accordingly, a high complementing pulse repetition frequency can coerce the cores into alternate states in a much shorter period of time than that required for complete switching without prejudicing reliable triggering of the master flip-flop.

The complementing flip-flop of the single figure also provides a D.C. level to indicate the core states since the potentials of the collectors of transistors 206, 210 indicate the states of cores 208, 212. This characeristic provides for nondestructive readout. Transistors 206, 210 also serve to isolate the switching wave forms appearing across load resistors 236, 234 due to changes in state of the master flip-flop 200.

The state of master flip-flop 200 may be determined by the potentials of the collectors of transistors 202, 204 of the master flip-flop or by the potentials of collectors 206, 210 of the steering gates. These terminals may also serve as the output terminals of the complementing flip-flop. Master flip-flop 200 may be set or reset by means of pulses applied to one or the other of a pair of transistors, one being connected in parallel with transistor 202 and the other being connected in parallel with transistor 204.

In the example of the embodiment of the invention illustrated, all the transistors are SN113's. As is well known in the art, NPN transistors may be substituted for PNP transistors provided the polarities of the supply voltages and the polarities of the triggering signals are reversed.

The values and/or types of components and the voltages appearing on the drawing are included, by way of example only, as being suitable for the devices illustrated. It is to be understood that circuit specifications in accordance with the invention may vary with the design of any particular application.

Obviously, many modifications and variations of the present invention are possible in the light of the above teachings. It is, therefore, to be understood that within the scope of the appended claims, the invention may be practiced other than as specifically described and illustrated.

I claim:

1. A bistable flip-flop comprising a first transistor and a second transistor each having a base, an emitter, and a collector; a first magnetic core and a second magnetic core each having a reset winding, a sensing winding, and a set winding; means coupling the base of said first transistor to said collector of said second transistor through said sensing winding of said second core; means coupling said base of said second transistor to said collector of said first transistor through said sensing winding of said first core; a first driver transistor and a second driver transistor each having a base, an emitter, and a collector; means coupling said collector of said first driver transistor to a source of potential through said reset winding of said first core and said set winding of said second core; means coupling said collector of said second driver transistor to a source of potential through said reset winding of said second core and said set winding of said first core; coupling means between said base of said first driver transistor and said collector of said first transistor; means coupling said base of said second driver transistor to said collector of said second transistor; a source of potential coupled to both bases of said driver transistors; means coupling said emitters of all of said transistors to a source of reference potential; and, series trigger windings inductively coupled to said cores for receiving pulses to change the state of the flip-flop.

2. A bistable magnetic core flip-flop comprising a first core and a second core each having a reset winding, a sensing winding, and a set winding; a circuit including a first transistor and a second transistor; a circuit including a third transistor and a fourth transistor; each of said transistors having a base, an emitter, and a collector; means coupling the base of the first transistor to the collector of the second transistor and to a source of potential; means coupling the collector of the third transistor to the base of the fourth transistor and to a source of potential; a source of reference potential coupled to the emitters of all said transistors; means coupling the base of the second transistor to the base of the fourth transistor through the sensing winding of said second core; means coupling the base of the third transistor to the base of the first transistor through the sensing winding of said first core; means coupling the collector of the first transistor to a source of potential through said reset winding of said first core and said set winding of said second core; means coupling the collector of said fourth transistor to a source of potential through said reset winding of said second core and said set winding of said first core; and, means coupled to said cores for changing the state of said magnetic core flip-flop.

3. The combination as defined in claim 2 wherein said means for changing the state of the flip-flop includes series windings inductively coupled to said first and said second core and a terminal coupled to said windings for receiving switching pulses.

4. A complementing flip-flop comprising a master flip-flop comprising two transistors, said master flip-flop having two distinguishable stable states and first and second input terminals, said master flip-flop assuming one of its two states when a proper signal is applied to the first input terminal and assuming the other of its two states when a proper signal is applied to the second input terminal, a third input terminal adapted to have an input signal comprising a plurality of complementing pulses applied thereto, and circuit means comprised of a pair of transistors and a pair of magnetic cores, controlled by the master flip-flop, and connected to the third terminal, said circuit means responsive to the application of each complementing pulse applied to the third terminal for applying a proper signal to that input terminal of the master flip-flop which causes said master flip-flop to change its state, said circuit means applying one such proper pulse to the master flip-flop for each complementing pulse applied to the third input terminal.

5. A complementing flip-flop comprising a first magnetic core and a second magnetic core; each of said cores having a trigger winding, a reset winding, a sensing winding, and a set winding; a first core driving transistor and a second core driving transistor; a master saturation flip-flop comprising a first and a second transistor; circuit means connecting the base of the first transistor of the master flip-flop to the collector of the second transistor of the master flip-flop through the sensing winding of the second core, circuit means connecting the base of the second transistor of the master flip-flop to the collector of the first transistor of the master flip-flop through the sensing winding of the first core, and circuit means for connecting the collectors of the first and second transistors of the master flip-flop to a source of collector potential; means connecting the collector of the first core driving transistor to a source of collector potential through the reset winding of the first core and the set winding of the second core; means for connecting the collector of the second core driving transistor to a source of collector potential through the reset winding of the second core and the set winding of the first core; circuit means connecting the base of the first core driving transistor to the collector of the first transistor of the master flip-flop; circuit means connecting the base of the second core driving transistor to the collector of the second transistor of the master flip-flop; and circuit means for applying trigger current pulses to the trigger winding of the first and second cores.

References Cited in the file of this patent

UNITED STATES PATENTS 2,874,372      Wesslund et al. _____ Feb. 17, 1959